US007051234B2

(12) United States Patent
Lo et al.

(10) Patent No.: US 7,051,234 B2
(45) Date of Patent: May 23, 2006

(54) METHOD AND SYSTEM FOR MANAGING OPTICAL STORAGE MEDIUM FILE SYSTEM STRUCTURES

(75) Inventors: Hong-Jing (James) Lo, Austin, TX (US); Christiaan Steenbergen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 573 days.

(21) Appl. No.: 10/361,104

(22) Filed: Feb. 7, 2003

(65) Prior Publication Data

US 2004/0172575 A1  Sep. 2, 2004

(51) Int. Cl.
*G06F 11/00* (2006.01)
(52) U.S. Cl. ...................................................... 714/15
(58) Field of Classification Search .................. 714/15, 714/3, 8, 13, 42, 6; 369/272.5, 116
See application file for complete search history.

(56) References Cited

U.S. PATENT DOCUMENTS

| 4,916,605 | A | * | 4/1990 | Beardsley et al. | 711/162 |
| 5,412,668 | A | * | 5/1995 | Dewey | 714/766 |
| 5,787,484 | A | * | 7/1998 | Norman | 711/159 |
| 6,131,147 | A | * | 10/2000 | Takagi | 711/159 |
| 6,154,437 | A | | 11/2000 | Utsunomiya et al. | 369/275.2 |
| 6,301,675 | B1 | * | 10/2001 | Andrews | 714/6 |
| 6,407,976 | B1 | | 6/2002 | Nagara et al. | 369/116 |
| 6,438,665 | B1 | * | 8/2002 | Norman | 711/159 |
| 6,445,669 | B1 | | 9/2002 | Hattori et al. | 369/116 |
| 6,469,968 | B1 | | 10/2002 | Van Den Enden et al. | 369/59.12 |
| 6,941,490 | B1 | * | 9/2005 | Ohran | 714/15 |
| 2002/0083366 | A1 | * | 6/2002 | Ohran | 714/13 |
| 2004/0073831 | A1 | * | 4/2004 | Yanai et al. | 714/7 |

OTHER PUBLICATIONS

U.S. Appl. No. 10/361,284 entitled "Method and System for Time Compensation of Re-Writable Optical Media Write Parameters" naming Christiann Steenbergen as inventor and filed on Feb. 10, 2003.

U.S. Appl. No. 10/376,807 entitled "Method and System for Reconditioning Optical Storage Media to Write Updated Information" naming Dean Hendrickson, Hong-Jing (James) Lo. And Christiann Steenbergen as inventors and filed on Feb. 28, 2003.

* cited by examiner

*Primary Examiner*—Nadeem Iqbal
(74) *Attorney, Agent, or Firm*—Hamilton & Terrile, LLP; Robert W. Holland

(57) ABSTRACT

An optical storage update module extends the life of re-writable optical medium, such as DVD+RW optical storage disks, by identifying data units having and lacking updates for information writes to commonly used portions of the optical medium and then writing the information by writing data units having updates and restricting the writing of at least some of the data units lacking updates. For instance, a stored file system structure of an optical medium, such as a UDF random writable file system, is read from the optical medium and compared with an updated file system structure to identify and write to the optical medium substantially only those data units changed by the updated file system structure. In one embodiment, file structure updates are written to the optical storage medium with Read Modify Write operations.

20 Claims, 2 Drawing Sheets

METHOD AND SYSTEM FOR MANAGING OPTICAL STORAGE MEDIUM FILE SYSTEM STRUCTURES

BACKGROUND OF THE INVENTION

1. Field of the Invention

The present invention relates in general to the field of storing information on optical medium, and more particularly to a method and system for managing optical storage medium file system structures.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often run applications that produce large quantities of data. One option available for storing large quantities of data on high capacity removable media is writing the data to optical disks such as compact disks (CDs) or digital versatile disks (DVDs). Re-writable optical disks, such as DVD+RW and CD–RW disks, offer the flexibility of re-using optical medium that has already had information stored on it. Re-writable optical medium have greater storage capabilities than magnetic floppy medium, and are adoptable to have similar functionality such as the embedding defect management and random writable file system capabilities through optical disk drives, including Read Modify Write operations. Re-writable optical disk drives bum data onto re-writable disks with lasers that alter the characteristics of the disk. However, after a number of data writes, optical disk medium wear-out and are no longer able to accept data writes. A typical optical medium life expectancy is for 1000 re-writes before failure of the optical medium is expected.

One difficulty with re-writable optical medium is that re-writes are not typically distributed evenly across the entire disk so that some portions of a disk fail before other portions. For instance, in a UDF formatted random re-writable optical medium users often perceive a shortened life expectancy when certain disk areas, such as file system structures, experience a greater number of writes than other disk areas. As an example, the UDF specification defines file system structures such as the logical volume descriptor blocks, sparing tables for defect management, and logical volume integrity descriptor blocks, to reside in the same logical block addresses. These file system structure areas are updated with each data write, resulting in a greater frequency of re-writes to the file system structure areas compared with data storage areas of the optical medium. The greater number of re-writes to the file system structure area leads to optical medium failure even though data storage areas, which have not experienced as frequent a number of re-writes, are able to support additional re-writes.

SUMMARY OF THE INVENTION

Therefore a need has arisen for a method and system which manages data writes to extend the usable life of re-writable optical medium.

A further need exists for a method and system which manages file system structures of re-writable optical medium to reduce re-writes of unchanged file structure information during optical medium disk writes.

In accordance with the present invention, a method and system are provided which substantially reduce the disadvantages and problems associated with previous methods and systems for managing data writes to re-writable optical medium. Information updates sent for writing to the optical medium are compared with information stored on the optical medium to identify changes. The updated information identified as changed is written to the optical medium and at least some of the updated information that does not change the stored information is restricted from being re-written to reduce the wear-out of the optical medium.

More specifically, an optical storage update module associated with an optical storage device compares information data units stored on an optical medium with updated information generated by an information handling system to identify file structure data units having updates and file structure data units lacking updates. For instance, updated file structure packets sent from a host information handling system are buffered with corresponding stored file structure packets read from the re-writable optical storage medium to compare the updated and stored file structure packets and identify file packets having differences due to the host update. The optical storage update module writes file structure data units identified as having updates to the optical medium and restricts writing of at least some file structure data units lacking updates. For instance, only file structure packets having updated information are written to a DVD+RW disk UDF formatted for use as a random writable medium. File structure updates resulting from file additions, removals, modifications, sector sparing, formatting or other write operations write only file structure packets having differences to the DVD+RW disk so that unnecessary re-writes of unchanged packets do not reduce the useful life of the disk. As an example, adding a defect entry to a sparing table writes substantially only the updated table entry rather than the entire table by writing only file structure packets changed by the added entry.

The present invention provides a number of important technical advantages. One example of an important technical advantage is that data writes are managed to extend the usable life of re-writable optical medium. Updated information sent to a re-writable optical disk for storage in frequently written disk areas are performed with Read Write Modify operations that compare data units of the updated information with corresponding data units of stored information to write only updated data units having changes from the stored data units. Restricting data writes to those data units having changes increases the effective life of the re-writable optical medium.

Another example of an important technical advantage of the present invention is that file system structures of re-writable optical medium are managed to reduce re-writes of unchanged file structure information during optical medium disk writes. For UDF formatted re-writable optical medium, managed updates of file system structures improves distribution of re-writes across the medium to provide improved optical medium lifespan. The impact on data write performance is minimized by applying selective management to file system structures at precise data units and applying normal disk management to data portions of the optical medium, such as sparing packets that fail due to wear-out.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A re-writable optical medium's lifespan is effectively extended by restricting re-writing of data to the optical medium where information written does not change stored information. An update module of an optical storage device compares file structure information generated by a host information handling system with file structure information stored on the optical medium to write substantially only updated file structure information generated by the information handling system to the optical medium. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
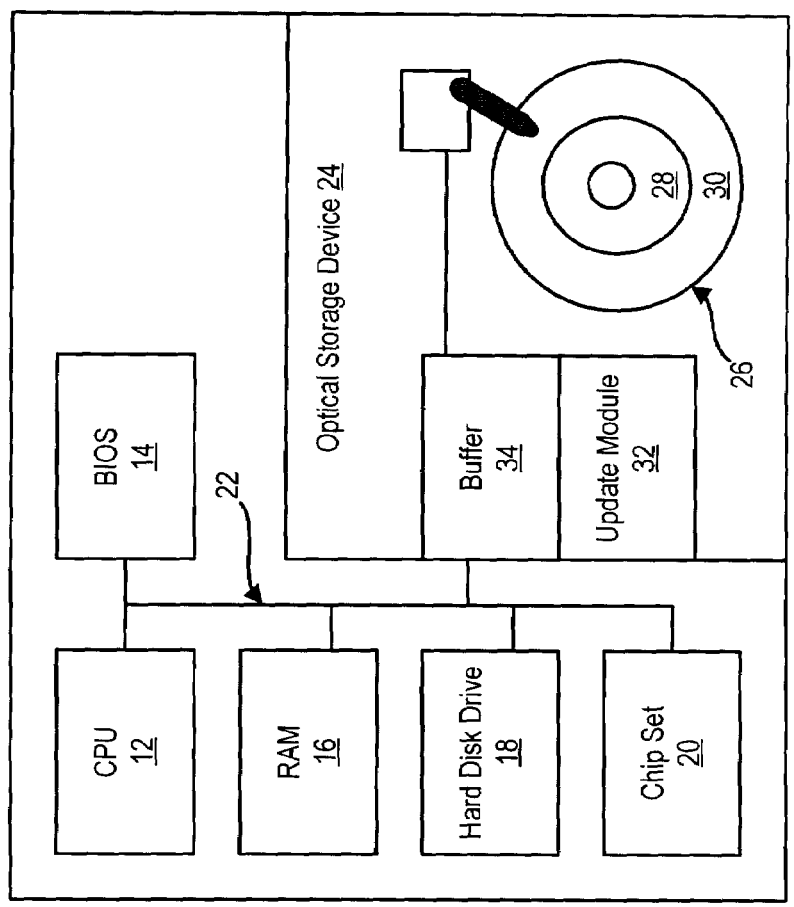
FIG. 1 depicts a block diagram of an information handling system operable to manage optical medium file structure updates.

Referring now to FIG. 1, a block diagram depicts an information handling system 10 operable to manage re-writable optical medium file structure updates. Information handling system 10 generates information through operations performed with a variety of components, such as CPU 12, BIOS 14, RAM 16, a hard disk drive 18 and a chip set 20, and communicates the generated information through a bus 22 for storage by an optical storage device 24 on a re-writable optical medium 26. For instance, re-writable optical medium 26 is a DVD+RW disk formatted for use as a UDF random writable medium having an inner portion 28 that stores a file system structure for information stored in an outer portion 30. The UDF specification defines logical block addresses that store the file system structure, such as the logical volume descriptor blocks, sparing tables for defect management and logical volume integrity descriptor blocks, in inner portion 28. When information handling system 10 writes information to outer portion 30 of optical medium 26, the file structure in inner portion 28 is updated. For example, the file structure is updated when files are added, removed or modified, when sectors are spared, when the optical storage device updates background formatting status, and when other similar operations are performed, exposing inner portion 28 to a higher frequency of re-writes than outer portion 30.

An update module 32 effectively extends the lifespan of optical storage medium 26 by reducing unnecessary file structure re-writes of file structure information that is not changed by a file structure update received from a host information handling system. When file structure updates are received, update module 32 performs Read Modify Write operations on file structure data units so that only the portion of the file structure changed by the update is written to the optical medium with substantially all unchanged data units left as stored on the optical medium to avoid unnecessary re-writing. For example, adding a defect entry to a UDF sparing table results in writing only the file structure data units to the optical medium that are changed by the added entry and does not require a re-write of the entire sparing table. As another example, updating a logical volume integrity descriptor block (LVID) does not require updating every field or re-writing over reserved areas.

In order to restrict the writing of unchanged file structure information to optical medium 26, update module 32 stores updated file structure information received from a host information handling system in a buffer 34. Update module 32 reads the file structure information stored on optical medium 26 with device arm 36 and stores the read file structure information in buffer 34. Update module 32 then compares data units of the updated file structure information with data units of the file structure information stored on optical medium 26 to identify data units changed by the update to the file structure information and data units that are not changed. Update module 32 stores the updated file structure information by writing only the identified changed data units to optical storage medium 26. Limiting re-writes to critical locations of an optical storage medium that contain file system structures provides a longer perceived life expectancy for the optical storage medium by reducing packet wear-out for the critical locations. For instance, for UDF formatted media, packet wear-out on a file system structure will render the media unusable whereas packet wear-out on a user data packet will only result in a sparing of the packet. Selective Read Modify Write operations for file system structures thus improve optical storage medium lifespan without substantially impacting storage rates for data packets not subjected to the Read Modify Write operation.

Figure 2:
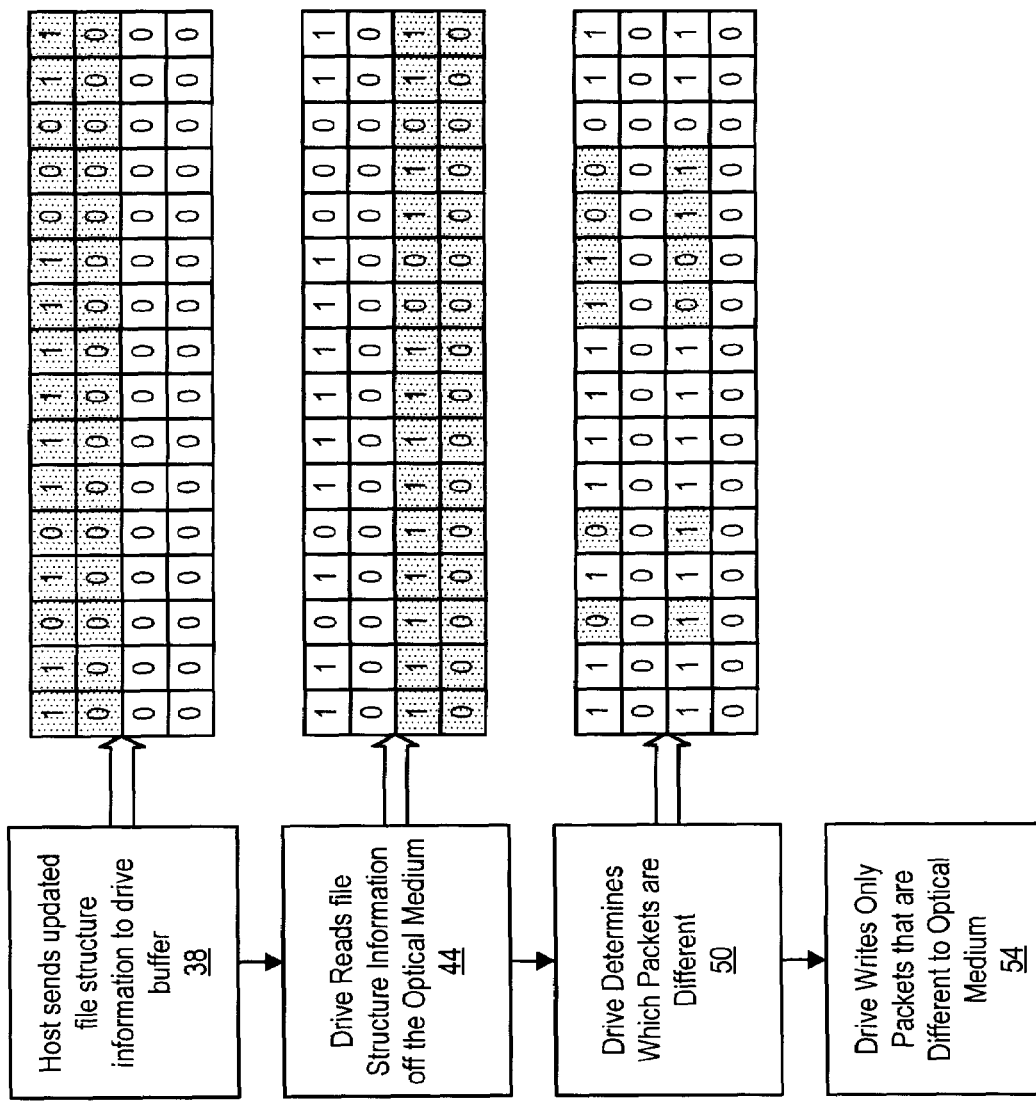
FIG. 2 illustrates the process for comparing and writing file structure units to an optical medium.

Referring now to FIG. 2, a flow diagram depicts a process for comparing and writing file structure information data units to a re-writable optical storage medium, such as a UDF formatted random writable DVD+RW disk. The process begins at step 38 with the sending from a host information handling system of updated file structure information to an optical disk drive buffer. Buffer image 40 illustrates an example of updated file structure information received from the host as 64 data units shaded as packets 42. For a UDF formatted DVD+RW disk, each packet includes 16 blocks of information with each block representing 16,384 bits of information. In alternative embodiments, different types of re-writable optical medium may be used and different sizes of data units, such as blocks, may be used.

At step 44, the optical disk drive reads the file structure information data units from the optical storage medium to the optical disk drive buffer. Buffer image 46 illustrates an example of stored file structure information retrieved from the optical storage medium as 64 data units shaded as packets 48. The updated file structure packets 42 and the stored file structure packets 48 are arranged for comparison in the drive buffer. At step 50, the optical drive compares the updated file structure packets 42 with the stored file structure packets 48 to identify the file structure packets that are different. Buffer image 52 illustrates the results of a comparison between buffer image 46 and buffer image 40 with the shaded packets representing the packets identified as having changed file structure information. At step 54, the optical disk drive writes only the packets that are different to the optical storage medium so that the file structure on the optical storage medium is updated with the file structure information changes without writing packets that have not changed to the optical storage medium.

Although the present invention has been described in detail, it should be understood that various changes, substitutions and alterations can be made hereto without departing from the spirit and scope of the invention as defined by the appended claims.

What is claimed is:

1. An information handling system comprising:
   information processing components operable to generate information for storage on an optical storage medium, the generated information including updates to information stored on the optical storage medium;
   an optical storage device operable to write the information to the optical storage medium, the information written as data units having a predetermined size; and
   an optical storage update module associated with the optical storage device and operable to compare information data units stored on the optical medium with generated information data units to detect file structure data units having updates and file structure data units lacking updates, the optical storage update module storing the generated information by writing to the optical storage device the file structure data units having updates and restricting the writing to the optical storage medium of at least some of the file structure data units lacking updates.

2. The information handling system of claim 1 wherein the optical storage media comprises a DVD+RW disk.

3. The information handling system of claim 1 wherein the optical storage media comprises a CD-RW disk.

4. The information handling system of claim 1 wherein the optical storage update module writes file structure data units having updates and restricts re-writing of file structure data units lacking updates by Reed Modify Write operations.

5. The information handling system of claim 1 wherein the optical storage medium comprises a UDF formatted random writable medium.

6. The information handling system of claim 5 wherein the file structure comprises logical volume descriptor blocks, sparing tables for defect management and logical volume integrity descriptor blocks.

7. The information handling system of claim 6 wherein a data unit having updates comprises a portion but Less than all of the logical volume integrity descriptor block.

8. A method for storing information on an optical storage medium, the method comprising:
   storing information on the optical storage medium in data units;
   generating updates to the information stored on the optical storage medium, the updates altering some but not all data units;
   determining one or more data units altered by the updates to the information and one or more data units unaltered by the updates to the information; and
   storing the updates to the information on the optical storage medium by writing the altered data units to the optical storage medium and leaving the unaltered data units on the optical storage medium.

9. The method of claim 8 wherein determining one or more data units altered by the updates further comprises determining file system structures of the optical storage medium altered by the updates to the information.

10. The method of claim 9 wherein the file system structure comprises UDF formatted file systems having logical block addresses.

11. The meted of claim 8 wherein determining one or more data units altered by the updates to the information and one or more data units unaltered by the updates to the information further comprises:
    buffering the data units into buffer memory;
    comparing the buffered data units with the stored data units to determine relevant data units having updates; and
    writing only the relevant data units to the optical storage medium.

12. The method of claim 11 wherein the relevant data units are file system structure information.

13. The method of claim 8 wherein the optical storage medium comprises a DVD+RW disk.

14. The method of claim 8 wherein the stored information comprises a sparing table having plural defect entries and the update comprises a defect entry added to the sparing table.

15. The method of claim 8 wherein storing the updates comprises a read modify write command.

16. A method for updating the file structure of a re-writable optical storage medium, the method comprising:
    sending updated file structure information from a host to an optical drive;
    reading the file structure information stored on the re-writable optical storage medium;
    comparing data units of the updated file structure information with data units of the file structure information stored on the re-writable optical storage medium to identify data units changed by the updated file structure; and
    updating the re-writable optical storage medium with the updated file structure information by writing only the identified file structure data units to the re-writable optical storage medium.

17. The method of claim 16 wherein reading the file structure information, comparing data units and updating the re-writable optical storage medium comprises performing Read Modify Writes to write the updated file structure to the re-writable optical storage medium.

18. The method of claim 16 wherein the updated file structure information comprises the addition of a defect entry to a sparing table and updating the re-writable optical storage medium further comprises updating data units associated with the added defect entry without updating unchanged sparing table entries.

19. The method of claim 16 wherein the updated file structure information comprises an update to a logical volume integrity descriptor and updating the re-writable optical storage medium further comprises writing changed fields without re-writing over reserved areas.

20. The method of claim 16 wherein the re-writable optical storage medium comprises a DVD disk.

* * * * *